US011954679B2

(12) United States Patent
Hamilton et al.

(10) Patent No.: US 11,954,679 B2
(45) Date of Patent: Apr. 9, 2024

(54) SYSTEM AND METHOD FOR IMPLEMENTING ENHANCED PAYMENT ON DELIVERY

(71) Applicant: Visa International Service Association, San Francisco, CA (US)

(72) Inventors: Sam Hamilton, Los Altos, CA (US); Akon Samir Dey, Foster City, CA (US); Vaibhav Prakash Gajre, Austin, TX (US); Veerabhadraiah Lingadhalli Matadha, Austin, TX (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 17/851,233

(22) Filed: Jun. 28, 2022

(65) Prior Publication Data

US 2023/0419320 A1 Dec. 28, 2023

(51) Int. Cl.
*G06Q 40/00* (2023.01)
*G06Q 20/02* (2012.01)
*G06Q 20/40* (2012.01)

(52) U.S. Cl.
CPC ............ *G06Q 20/40* (2013.01); *G06Q 20/02* (2013.01)

(58) Field of Classification Search
CPC ..................................................... G06Q 40/00
USPC ...................................................... 705/35–45
See application file for complete search history.

(56) References Cited

U.S. PATENT DOCUMENTS

| 11,200,306 | B1* | 12/2021 | Singh ..................... H04W 12/63 |
| 2014/0279666 | A1* | 9/2014 | Lievens ............. G06Q 10/0837 235/375 |
| 2017/0154324 | A1 | 6/2017 | Singh et al. |
| 2018/0150900 | A1* | 5/2018 | Kurian ................. G06Q 10/083 |
| 2019/0266550 | A1* | 8/2019 | Santosh .................... G06F 9/54 |
| 2019/0318355 | A1 | 10/2019 | Chopra et al. |
| 2020/0134555 | A1 | 4/2020 | Anand |
| 2021/0035072 | A1 | 2/2021 | Awasthi |
| 2021/0174332 | A1* | 6/2021 | Chen ..................... G06Q 20/12 |
| 2022/0131845 | A1 | 4/2022 | Gaddam |

* cited by examiner

*Primary Examiner* — William E Rankins
(74) *Attorney, Agent, or Firm* — Buckley Patent Law LLC/ VISA; Timothy Buckley

(57) ABSTRACT

In some embodiments, a method includes receiving, from a user of a user device, a request for an authorization-by-proxy payment on delivery (POD); requesting, at the user device, the user identify an authorized proxy for the authorization-by-proxy POD; generating an authorization-by-proxy code based upon buyer-controlled payment control parameters; and using the buyer-controlled payment parameters to control processing of a payment for the authorization-by-proxy POD. In some embodiments, the method further includes pre-authorizing, at shipment time of merchandise associated with the authorization-by-proxy POD, a hold on a monetary amount associated with an order of the merchandise associated with the authorization-by-proxy POD.

5 Claims, 3 Drawing Sheets

SYSTEM AND METHOD FOR IMPLEMENTING ENHANCED PAYMENT ON DELIVERY

BACKGROUND

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

A steady growth of online shopping over the last few years has caused an increase in online purchases being delayed during delivery of the merchandise. The increased delay in delivery of the online purchases has resulted in increased costs to consumers due to, for example, interest rate charges being billed to the credit cards used to purchase the merchandise. In a typical online shopping transaction, the consumer pays for the merchandise upfront with a credit card and, when waiting for the delivery of the merchandise, the consumer is billed during the delayed time in shipment. The amount of delay time added by the delay in shipment may extend from a few days to even several weeks or months, during which the consumer being billed for undelivered merchandise loses out on the ability to use the funds that have been placed on hold prior to shipment of the merchandise. Therefore, a need exists to provide improved purchasing options that allow consumers to access funds during delayed times of merchandise delivery.

DETAILED DESCRIPTION

Figure 1:
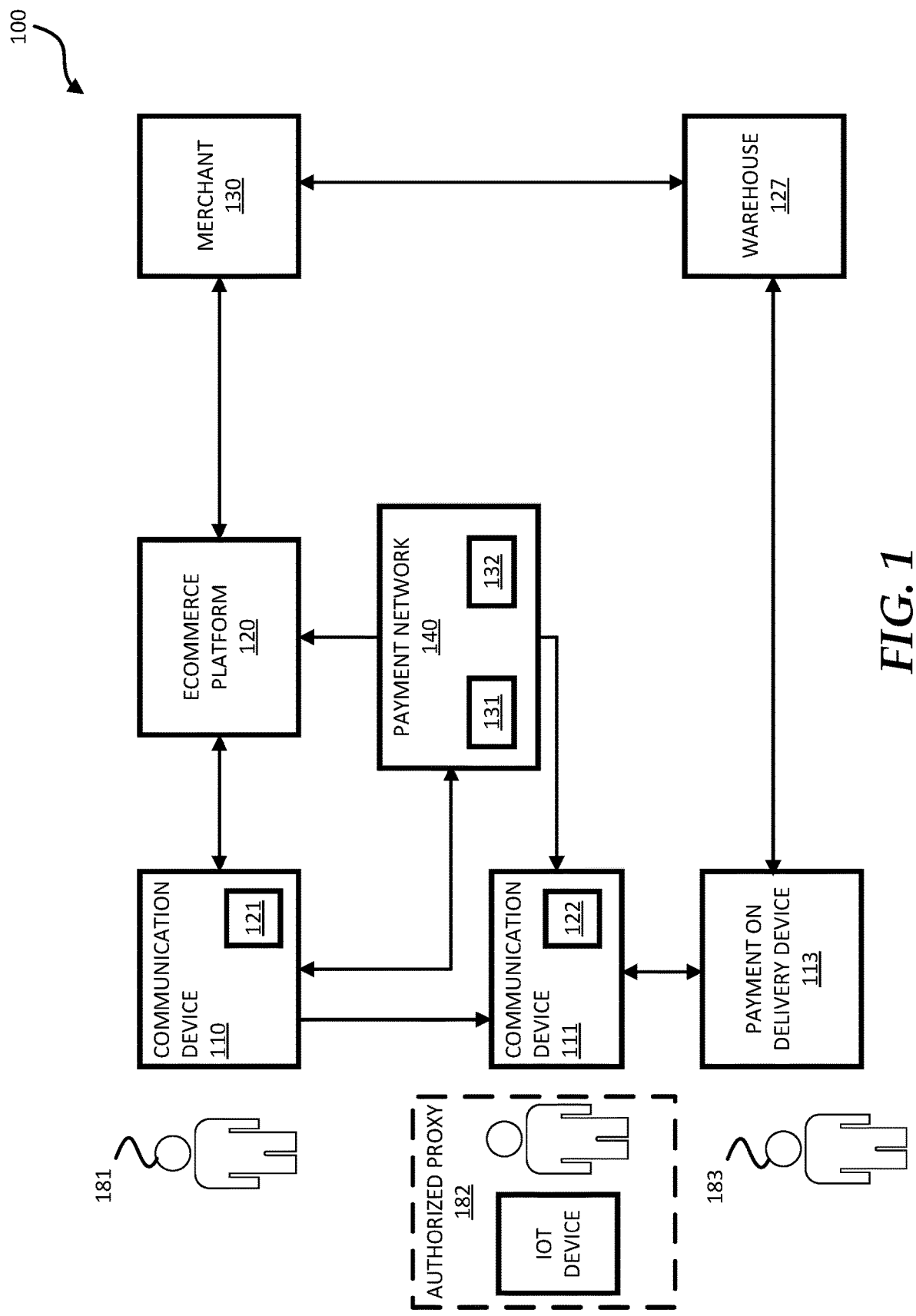
FIG. 1 is a block diagram of a payment on delivery system in accordance with some embodiments.

A description of terms is provided below to assist in the understanding of the payment on delivery (POD) system and embodiments described herein.

In some embodiments, a "payment device" may include any suitable device capable of making a payment. For example, a payment device can include a card including a credit card, debit card, charge card, gift card, or any combination thereof. In some embodiments, a payment device may be used in conjunction with a communication device, described further herein.

In some embodiments, a "payment processing network" or "payment network" (e.g., VisaNet™) may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™ in particular, includes a VIP system (Visa Integrated Payments system) which processes authorization requests, pre-authorization requests, and a Base II system which performs clearing and settlement services.

In some embodiments, a "server computer" may be a powerful computer or a cluster of computers. For example, the server computer may be a large mainframe, a minicomputer cluster, or a group of servers functioning as a unit. In one example, the server computer may be a database server coupled to a Web server.

In some embodiments, a "terminal" (e.g. a point-of-service (POS) terminal) may be any suitable device configured to accept and process payment transactions such as, credit card or debit card transactions, or electronic settlement transactions, and may have optical, electrical, or magnetic readers for reading data from other portable communication devices such as smart cards, keychain device, cell phones, payment cards, security cards, access cards, and the like.

In some embodiments, an "acquirer" may be a business entity (e.g., a commercial bank) that has a business relationship with the merchant and receives some or all of the transactions from the merchant.

In some embodiments, an "issuer" may be a business entity that issues a card to a user and may be, for example, a financial institution.

In some embodiments, a "cardholder" may be a type of user that is authorized to use a payment card issued by the issuer. The terms "cardholder" and "user" may be used interchangeably in the following description. A "user" and/or "cardholder" may be any competent individual.

In some embodiments, a "communication device," as described herein, may be an electronic communication device that can execute and/or support electronic communications including, but not limited to, payment transactions. Some examples include a personal digital assistant (PDA), a smart phone, tablet computer, notebook computer, and the like.

In some embodiments, an "authorization request message" may be an electronic message that is sent to a payment processing network, payment network, and/or an issuer of a payment card to request authorization for a transaction. An authorization request message according to some embodiments may comply with (International Organization of Standardization) ISO 8583, which is a standard for systems that exchange electronic transaction information associated with a payment made by a consumer using a payment device or payment account. In some embodiments, the authorization request message may include an issuer account identifier that may be associated with a payment device or payment account. In some embodiments, an authorization request message may also comprise additional data elements corresponding to "identification information" (i.e., payment device information) including, by way of example only: a service code, a CVV (card verification value), a dCVV (dynamic card verification value), an expiration date, etc. In some embodiments, an authorization request message may also comprise "transaction information," such as any information associated with a current transaction, such as the transaction amount, merchant identifier, merchant location, etc., as well as any other information that may be utilized in determining whether to identify and/or authorize a transaction. However, it may be appreciated that the authorization request messages described herein may contain additional elements not defined in the ISO 8583 specification.

In some embodiments, an "authorization response message" may be an electronic message reply to an authorization request message generated by an issuing financial institution or a payment processing network. In some embodiments, the authorization response message may include, by way of example only, one or more of the following status indicators: Approval—transaction was approved; Decline—transaction was not approved; or Call Center— response pending more information, merchant must call the toll-free authorization phone number.

In some embodiments, a "communications channel" may include any suitable path for electronic communication between two or more entities. Suitable communications channels may be present directly between two entities such as a payment processing network and a merchant or issuer computer, or may include a number of different entities. Any suitable communications protocols may be used for generating a communications channel. A communication channel may in some instance comprise a "secure communication channel," which may be established in any known manner, including the use of mutual authentication and a session key and establishment of a secure socket layer (SSL) session. However, any method of creating a secure channel may be used. By establishing a secure channel, sensitive information related to a payment device (such as account numbers, CVV values, expiration dates, etc.) may be securely transmitted between the two or more entities to facilitate a transaction.

In some embodiments, a "digital wallet provider" may include any suitable entity that can maintain a digital wallet. A digital wallet provider may provide standalone cardholder facing software applications that store account numbers, or representations of the account numbers (e.g., tokens), on behalf of a cardholder to facilitate payments at more than one unrelated merchant, perform person-to-person payments, or load financial value into the digital wallet.

In some embodiments, a "merchant of record" may include a merchant that has a relationship with the payment processing network. The merchant of record receives the proceeds from the cardholder when a purchase is settled. The merchant of record is the company that is ultimately responsible for the financial transaction.

In some embodiments, a "payment service provider" may include an entity that contracts with an acquirer for the purpose of providing acceptance to a sponsored merchant, the sponsored merchant then contracts with a payment service provider to obtain payment services.

In some embodiments, a "card on file transaction" may include a transaction that is conducted using a stored account identifier. A card on file transaction can include transactions initiated by merchants, payment service providers, and/or a digital wallet service provider with, for example, a payment card account number that has been previously collected from the cardholder.

In some embodiments, an "access device" may include any device capable of initiating a payment transaction or accepting a payment device. The access device allows for acceptance of a payment card via inserting, swiping, manual key entry, digital wallet, secure token, etc. The access device can communicate with the acquirer, sometimes via the merchant, using a wired or wireless communication.

In some embodiments, "access device information" may include data relating to an access device used to conduct a payment transaction. Access device information can include, but is not limited to, information indicating whether a mobile device, a contactless reader, or a magnetic stripe reader was used to conduct the payment transaction. Access device information may also include information about the specific access device including an access device manufacturer's identifier, an access device make, an access device model, digital certificates associated with the specific access device, etc.

In some embodiments, "payment device characteristic information" may include data regarding a payment device that is used to conduct a payment transaction. Payment device characteristic information may include, but is not limited to, information indicating whether a physical card, a mobile device, or a token was used to conduct the payment transaction.

In some embodiments, a "transaction initiation channel" may include a channel that is used to conduct a payment transaction. The transaction initiation channel indicates whether a payment transaction was conducted at a physical store, online, via mail order, via telephone order, etc.

In some embodiments, a "transaction initiation mode" may define the type of transaction between a consumer and a merchant. The transaction initiation mode may be determined based on the access device information and the payment device characteristic information. Some transaction initiation modes include, but are not limited to, magnetic stripe read, chip card, secure mobile near field communication (NFC), manual primary account number (PAN) entry, card account on file, certified token, and uncertified token.

In some embodiments, a "token" may include a substitute for a primary account identifier such as a primary account number. In some embodiments, a token may be used in lieu of the primary account number and may be used to generate original and subsequent transactions for an entire transaction lifecycle. A token may be in a format that is similar to a primary account number. For example, if a real primary account number has 16 digits, then a corresponding payment token may also have 16 digits.

In some embodiments, a "virtual account" may be an account associated with a user of a payment system that is virtual. In some embodiments, a virtual account may be a virtual payment account that may be used in the processing of a transaction. In some embodiments, for example, a virtual account may be a virtual account that may be involved in the processing of credit or debit values. In some embodiments, a virtual account number (VAN) may be an account number associated with a virtual account.

FIG. 1 is a block diagram of a payment on delivery (POD) system 100 in accordance with some embodiments. In some embodiments, the POD system 100 includes a communication device 110, a communication device 111, a payment-on-delivery device 113, an ecommerce platform 120, a payment network 140, a merchant 130, a payment control unit 131, an account verification unit 132, and a warehouse 127. In some embodiments, the communication device 110 may include a payment-control-based payment on delivery (PCB-POD) application 121. In some embodiments, the PCB-POD application 121 is a software application that is configured to allow user 181 to utilize payment controls in a restricted virtual account number (RVAN) to limit a time at which a user 181 of an ecommerce platform is billed for delivery of merchandise ordered for payment on delivery (described further herein). In addition, the PCB-POD application 121 is configured to allow user 181 to utilize an authorized proxy 182 to pay for and accept deliverance of the merchandise ordered using the ecommerce platform 120. In some embodiments, the RVAN may also be referred to as an authorization-by-proxy code since the RVAN is configured to allow the authorized proxy 182 to pay for and receive the POD.

In some embodiments, the communication device 111 may include a PCB-POD application 122. In some embodiments, the PCB-POD application 122 is a software application that is configured to allow the authorized proxy 182 to pay for and receive the merchandise ordered on the ecommerce platform 120 utilizing the RVAN generated by the payment network 140 using PCB-POD application 121.

In some embodiments, the payment on delivery device 113 is a communication device utilized by a delivery person to deliver merchandise from warehouse 127 for payment on delivery ordered utilizing PCB-POD application 121 and ecommerce platform 120. In some embodiments, the ecommerce platform 120 is a software application or website operated by the merchant 130 that is configured to allow for the purchase of merchandise and processing of payment transactions, such as, for example, credit card transactions or debit card transactions. In some embodiments, the ecommerce platform 120 may be located at and controlled by merchant 130. In some embodiments, the ecommerce platform 120 may be installed on communication device 110 or communication device 111. In some embodiments, the ecommerce platform 120 may include an electronic storefront, a shopping cart, and other functions associated with e-commerce Web sites.

In some embodiments, the merchant 130 and the ecommerce platform 120 may be in communication with an issuer (not shown) via an acquirer (not shown) and the payment network 140. In some embodiments, the acquirer includes an acquirer computer (not shown) and the issuer includes an issuer computer (not shown). In some embodiments, the payment network 140 may include an authorization and settlement server and/or additional servers (not shown) to carry out the various transactions described herein. In some embodiments, the communication device 110 may be in communication with the various entities shown in FIG. 1 via an interconnected network (not shown). In some embodiments, the interconnected network may also be in communication with a server computer.

In some embodiments, the communication device 110 and the communication device 111 may be a personal digital assistant (PDA), a smart phone, tablet computer, notebook computer, or the like, that can execute and/or support payment transactions with the POD system 100. In some embodiments, communication device 110 and communication device 111 may be used in conjunction with a payment device, such as a credit card, debit card, charge card, gift card, or other payment device and/or any combination thereof. In some embodiments, the communication device 110 may be used in conjunction with transactions of currency or points (e.g., points accumulated in a particular software application). In some embodiments, the communication device 110 may be a wireless device, a contactless device, a magnetic device, or other type of payment device that would be known and appreciated by one of ordinary skill in the art with the benefit of this disclosure. In some embodiments, the communication device 110 includes software (e.g., application) and/or hardware to perform the various payment transactions and capture user voice data to perform the operations described herein.

In some embodiments, the acquirer (e.g., acquirer bank) includes an acquirer computer (not shown). In some embodiments, the acquirer computer may be configured to transfer data (e.g., bank identification number (BIN), etc.) and financial information to the payment network 140. In some embodiments, the acquirer does not need to be present in the POD system 100 for the communication device 110 to transfer the financial and user data to the payment network 140.

In some embodiments, the payment network 140 may be any suitable combination of computers that facilitate the operations described herein, including payment transactions involving a number of issuers and merchants. An example of a payment processing network is VisaNet™, where Visa internal processing (VIP) performs the various payment network 140 or multi-lateral switch functions described herein. In some embodiments, the payment network 140 may include an authorization and settlement server (not shown). In some embodiments, the authorization and settlement server ("authorization server") performs payment authorization functions. In some embodiments, the authorization server is further configured to send and receive authorization data to the issuer.

In some embodiments, the issuer is a business entity which issues an account or funding account for a user 181. In some embodiments, the account may be associated with a payment card used by the user 181. In some embodiments, an issuer may be a financial institution. In some embodiments, the issuer is configured to receive authorization data from the payment network 140 (e.g., the authorization server).

In some embodiments, communication device 110, communication device 111, payment on delivery device 113, ecommerce platform 120, warehouse 127, and merchant 130, may be connected to and communicate with each other and with the payment network 140 via an interconnected network (not shown). In some embodiments, an example of an interconnected network may be the Internet. In some embodiments, the payment network 140 may inform the communication device 110, communication device 111, and/or payment on delivery device 113, when a payment has been successfully processed. In some embodiments, the payment network 140 may be connected to and communicate with the communication device 110, the communication device 111, and/or the ecommerce platform 120 via the interconnected network. In some embodiments, the payment network 140 may inform the ecommerce platform 120 when a payment has been successfully processed which in turn the ecommerce platform 120 may complete the transaction with the communication device 110, communication device 111, and/or payment on delivery device 113.

In some embodiments, a server computer (not shown) is in operative communication with the interconnected network. In some embodiments, the server computer may be configured to perform a number of functions including, for example, determining a particular transaction initiation mode based on a number of different data elements, apply specific rules based on a determined transaction initiation mode, and generate credential values that may be used in electronic payment transactions. Although the server computer may be separate from entities such as the payment network 140, the server computer may be incorporated into entities such as the payment network 140 in other embodiments.

In some embodiments, the interconnected network (not shown) may comprise one or more of a local area network, a wide area network, a metropolitan area network (MAN), an intranet, the Internet, a Public Land Mobile Network (PLMN), a telephone network, such as the Public Switched Telephone Network (PSTN) or a cellular telephone network (e.g., wireless Global System for Mobile Communications (GSM), wireless Code Division Multiple Access (CDMA), etc.), a VoIP network with mobile and/or fixed locations, a wireline network, or a combination of networks.

In some embodiments, with further reference to FIG. 1, user 181 utilizes the ecommerce platform 120 (external or internal to communication device 110) to order merchandise for payment-controlled payment on delivery. In some embodiments, prior to or upon ordering of the merchandise on ecommerce platform 120, user 181 utilizes the PCB-POD application 121 installed on communication device 110 to request a restricted virtual account number (RVAN) from payment network 140. In some embodiments, the RVAN is a buyer controlled, restricted, single-use token that is customized with authorization and payment controls to limit payment timing and payment authority attributes associated with the merchandise purchased by user 181. In some embodiments, the RVAN is configured to utilize the payment controls or payment control parameters to limit a time at which the user 181 of an ecommerce platform is billed for delivery of merchandise ordered for payment on delivery. In some embodiments, the payment control parameters may include, for example, a restriction on payment timing, a restriction on shipment duration (e.g., a date restriction and a time restriction), a block/unblock transaction restriction, a merchant category group, a merchant category code, a restriction on a spending limit, and/or a restriction on a location (e.g., a zip code restriction). In some embodiments, upon request of the RVAN, user 181 inputs the payment controls into the PCB-POD application 121, which, in turn, provides the payment controls to payment network 140 for generation of the RVAN based on the payment controls.

In some embodiments, payment network 140 receives the payment controls from PCB-POD application 121 and generates the RVAN based on the buyer-controlled payment controls. In some embodiments, payment network 140 (e.g., VisaNet™) utilizes an Integrated Payments System (IPS) (e.g., Visa Integrated Payments System) to generate the RVAN. In some embodiments, the IPS includes a payment control unit 131 and an account verification unit 132 that utilizes an existing card account tokenization system and existing APIs, in addition to the newly defined payment controls, to define and generate the RVAN and enable online transactions and payment at the point of delivery of merchandise ordered by user 181. In some embodiments, after generating the RVAN, the payment network 140 provides the RVAN to the PCB-POD application 121 of communication device 110.

In some embodiments, the PCB-POD application 121 receives the RVAN and provides the RVAN to ecommerce platform 120 for pre-authorization of the invoice amount for the payment of the merchandise ordered on the ecommerce platform 120. In some embodiments, the PCB-POD application 121 receives the RVAN and provides the RVAN to user 181, who, in turn, provides the RVAN to the ecommerce platform 120 for pre-authorization of the invoice amount for the payment of the merchandise ordered on the ecommerce platform 120. In some embodiments, pre-authorization may not occur until shipment of the merchandise by merchant 130. In some embodiments, upon receipt of the RVAN from payment network 140, user 181 uses the PCB-POD application 121 to block use of the RVAN for actual payment of the merchandise until user 181 unblocks or gives permission to use the RVAN for payment in PCB-POD application 121. In some embodiments, actual payment is the actual transfer of funds from the funding account of the user 181 to the bank account associated with the merchant 130. In some embodiments, as stated previously, the payment controls may include a restriction to block transfer of funds to the merchant 130 until the user 181 unblocks the transfer of funds restriction. In some embodiments, to facilitate use of the RVAN for pre-authorization only until the blocking by the user 181 is lifted, the RVAN generated by payment network 140 and provided to the merchant 130 is placed in a disabled state that prevents merchant 130 from transferring funds to the account of merchant 130 until the block is lifted.

In some embodiments, the merchant 130 via ecommerce platform 120 receives the RVAN from the PCB-POD application 121 and utilizes the payment network 140 to validate the RVAN for pre-authorization. In some embodiments, merchant 130 uses a credit card pre-authorization process provided by network 140 to pre-authorize the invoice amount. In some embodiments, the payment network 140 validates and pre-approves the RVAN for the invoice amount of the merchandise and provides the pre-authorization approval to merchant 130.

In some embodiments, when merchant 130 receives pre-authorization approval for the invoice amount of the purchase on ecommerce platform 120, merchant 130 commences the process of preparing the merchandise ordered by the user 181 for shipment. In some embodiments, when the order is ready for shipment, merchant 130 ships the merchandise to the address provided by user 181 and notifies user 181 of the shipment via PCB-POD application 121.

In some embodiments, upon or after shipment of the merchandise to the address provided by the user 181, the user 181 provides (or pushes) the RVAN to authorized proxy 182 via PCB-POD application 122 to allow authorized proxy 182 to pay for and receive the merchandise when delivered by the delivery person 183. In some embodiments, to enable the proxy authorization process, user 181 utilizes the PCB-POD application 121 on communication device 110 to push the RVAN to the authorized proxy device (e.g., communication device 111).

In some embodiments, authorized proxy 182 receives the RVAN from PCB-POD application 121 and lifts the block on the RVAN to allow for payment and receipt of the POD. In some embodiments, user 181 may lift the block on the RVAN to allow for payment and receipt of the POD by authorized proxy 182. In some embodiments, when the delivery person 183 delivers the order to the authorized proxy 182, the authorized proxy 182 provides the RVAN to the delivery person or utilizes the PCB-POD application 122 of the communication device 111 to input the complete the payment and in turn receives the delivery from the delivery person 183.

In some embodiments, as part of PCB-POD process, the PCB-POD application 121 and/or payment network 140 is configured to determine whether the shipment process by the merchant 130 meets the payment controls enumerated in the RVAN. For example, PCB-POD application 121 may determine whether the merchandise is ready for shipment within the prescribed ready for shipment time payment control restriction indicated in the payment controls of the RVAN. In some embodiments, when the PCB-POD application 121 determines that the payment controls have been met, the PCB-POD application 121 sends a notification to the merchant 130 to ship the merchandise. In some embodiments, after receiving the notification, the merchandise is shipped to the address provided by the user 181.

In some embodiments, when PCB-POD application 121 determines that the payment controls have not been met, the order submitted by user 181 may be cancelled or the user 181 may allow the order to proceed but further block use of the RVAN until, for example, payment control parameters are met. In addition, merchant 130 may run an additional pre-authorization on a newly generated RVAN for further approval. In some embodiments, when the payment control parameters have been met, merchant 130 may begin shipment of the merchandise ordered on the ecommerce platform 120.

Figure 2:
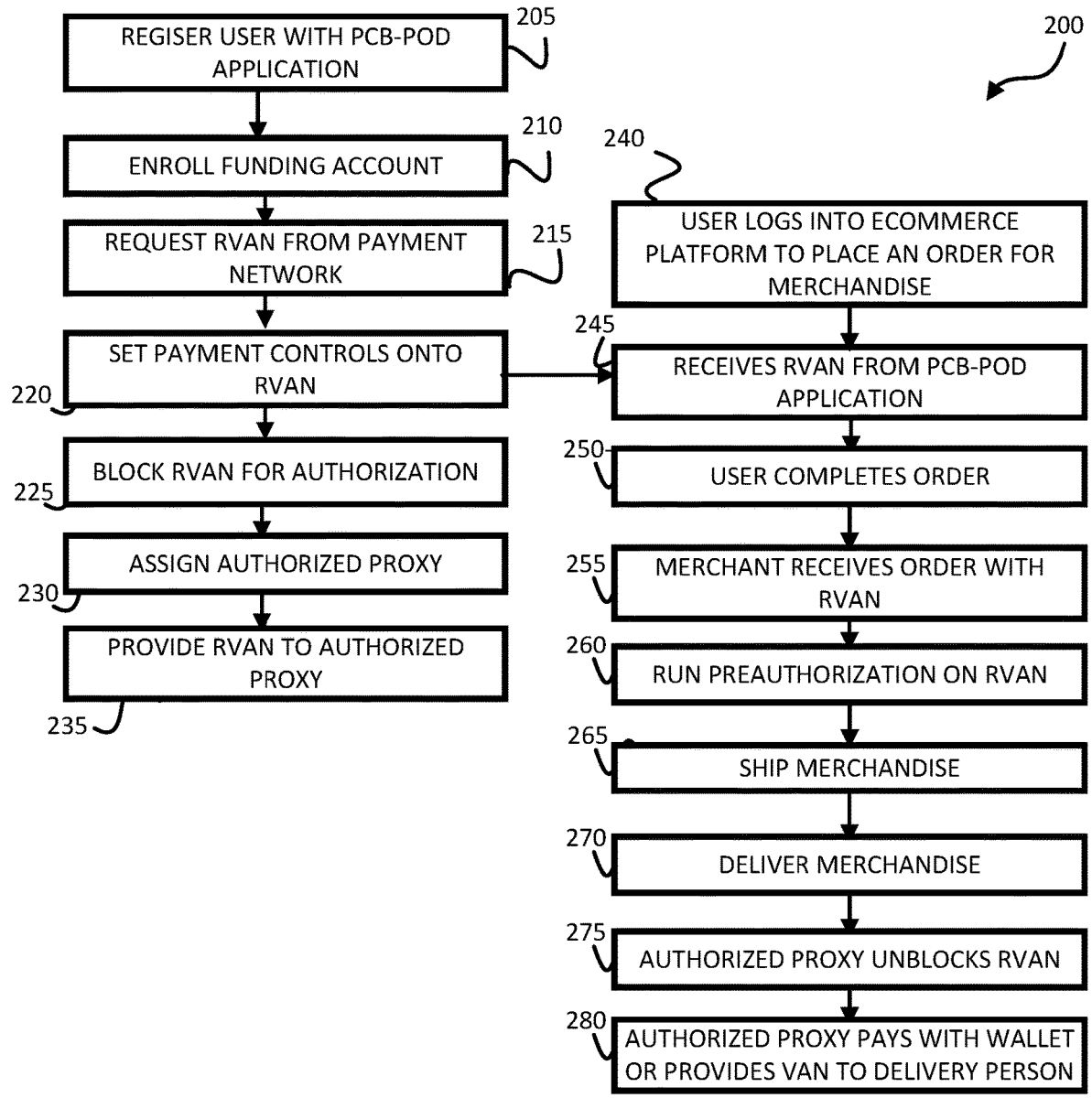
FIG. 2 is a flow diagram illustrating a method that performs a payment-controlled payment on delivery in accordance with some embodiments.

FIG. 2 is a flow diagram illustrating a method 200 for payment-controlled payment on delivery in accordance with some embodiments. The method, process steps, or stages illustrated in the figures may be implemented as an independent routine or process, or as part of a larger routine or process. Note that each process step or stage depicted may be implemented as an apparatus that includes a processor executing a set of instructions, a method, or a system, among other embodiments. In some embodiments, the method 200 is described with reference to the figures described herein.

In some embodiments, at operation 205, user 181 registers with the PCB-POD application 121 using communication device 110. In some embodiments, as part of the registration process, the user 181 provides personal information, such as, for example, a user name, a user address, a user email address, or other user specific information required by PCB-POD application 121 for registration of the user 181.

In some embodiments, at operation 210, user 181 enrolls a funding account with the PCB-POD application 121. In some embodiments, the funding account may be, for example, a credit card account, a bank account, a savings account, or some other type of account used to pay for merchandise or services purchased by user 181 on ecommerce platform 120. In some embodiments, after user 181 enrolls the funding account enrollment with the PCB-POD application 121, as part of the enrollment process, the payment network 140 validates the authenticity of the funding account associated with the user 181 using standard payment account validation techniques.

In some embodiments, at operation 215, after successful enrollment of the funding account, user 181 or PCB-POD 121 requests an RVAN from payment network 140 for use in the purchase of merchandise using PCB-POD. In some embodiments, as stated previously, the RVAN is a buyer-controlled restricted, single use fixed-value token that is generated by, for example, the IPS or an authorization-by-proxy code generation unit of payment network 140 and utilized by the authorized proxy 182 to consummate payment on delivery of the merchandise. In some embodiments, the payment network 140 provides the RVAN and the RVAN information details of the RVAN directly to the user 181 via, for example, a secure text messaging system or PCB-POD application 121.

In some embodiments, at operation 220, user 181 sets the payment controls of the RVAN utilizing payment control parameters. In some embodiments, as stated previously, the payment control parameters may include a restriction on payment timing, a restriction on shipment duration (e.g., a date restriction and a time restriction), a block/unblock transaction restriction, a merchant category group, a merchant category code, a restriction on a spending limit, and/or a restriction on a location (e.g., a zip code restriction). In some embodiments, the payment control parameters may leverage, for example, a payment controls application programming interface (API) (e.g., Visa Payment Controls API (VPC)). In some embodiments, the payment controls in the payment controls API may be set according to additional user preferences or requirements and may decide granularity for usage of the RVAN.

In some embodiments, at operation 225, user 181 utilizes PCB-POD application 121 to block utilization of the RVAN for specific authorizations. In some embodiments, for example, user 181 blocks utilization of the RVAN for payment of the merchandise until delivery of the merchandise to user 181 or an authorized proxy 182 of user 181. In some embodiments, user 181 may utilize the VPC to block utilization of the RVAN by merchant 130 for payment of the merchandise until delivery of merchandise by delivery person 183.

In some embodiments, at operation 230, user 181 assigns authorized proxy 182 to receive the delivery of the merchandise ordered for POD by user 181. In some embodiments, the authorized proxy 182 may be, for example, a friend, a spouse, a relative, or another person trusted by user 181 to receive and pay for the merchandise delivered by delivery person 183. In some embodiments, the user 181 assigns the authorized by inputting the first name of the authorized proxy 182, the last name of the authorized proxy 182, and a telephone number and/or email address of the authorized proxy 182 into the PCB-POD application 121. In some embodiments, to facilitate a secured transaction between the authorized proxy 182 and delivery person 183, user 181 may also input a photograph of the authorized proxy 182.

In some embodiments, at operation 235, user 181 utilizes the PCB-POD application 121 to provides or push the RVAN to the PCB-POD application 122 of the communication device 111 associated with the authorized proxy 182. In some embodiments, after receiving the RVAN from user 181, the authorized proxy 182 may utilize the RVAN or an electronic wallet associated with the RVAN to pay for and receive delivery of the merchandise by the delivery person 183 of the merchandise at operation 280, described further in detail herein.

In some embodiments, referring now to operation 240, user 181 logs into ecommerce platform 120 and places an order for merchandise using PCB-POD. In some embodiments, at operation 245, during placement of the order on the e-commerce platform, the user 181 or the payment network 140 fetches and/or receives the RVAN from the PCB-POD application 121 and uses the RVAN at operation 250 to complete the ordering of the merchandise on the ecommerce platform 120.

In some embodiments, at operation 255, merchant 130 receives the order with RVAN from the user 181. In some embodiments, at operation 260, after receiving the order from user 181, merchant 130 executes a pre-authorization of the RVAN to prepare the order for delivery to the address provided by user 181. In some embodiments, the pre-authorization of the RVAN includes utilizing a standard credit card authorization process for approval and validation of the invoice amount submitted for the merchandise ordered by user 181.

In some embodiments, the payment control parameters may be configured such that pre-authorization may not occur until the time of shipment of the merchandise ordered by the user 181. In some embodiments, pre-authorization includes placement of a hold on the funds to be used to purchase the merchandise for PCB-POD. In some embodiments, the funds of the user 181 to be used to purchase the merchandise are not placed on hold to purchase the merchandise until pre-authorization occurs at time of shipment. In some embodiments, by delaying the pre-authorization until the order is being shipped by the merchant 130 (when, for example, supply chain issues prevent the ordered merchandise from being shipped upon ordering of the merchandise), a hold is not being placed on the funding account of user 181 and the user 181 has access to the funds that would otherwise by placed on hold.

In some embodiments, for example, for an order placed by user 181 at a first time, but due to lack of inventory or proper logistics by the merchant 130 is not to be shipped until a delayed time (e.g., the goods are not to be delivered for several months), based upon an assessment of the payment control parameters, the payment network 140 may not perform a pre-authorization until the time of shipment, thus ensuring that the funds are not placed on hold and are available for use by user 181 until the goods are ready to be shipped to address provided by user 181. In some embodiments, the payment control parameters may be configured to notify the merchant 130 that a credit check or credit worthiness check of the user 181 may be performed by the merchant 130 to serve as an indication that the pre-authorization that occurs at the time of shipment is likely to be approved.

In some embodiments, at operation 265, merchant 130 ships the order to address provided by user 181 for delivery. In some embodiments, at operation 270, the delivery person 183 of the merchandise ordered by user 181 delivers the merchandise to the authorized proxy 182 at the address provided by the user 181.

In some embodiments, at operation 275, prior to or at the time of transfer of the merchandise from the delivery person 183 to the authorized proxy 182, the authorized proxy 182 or user 181 removes the block on the RVAN initiated by user 181 using PCB-POD application 121.

In some embodiments, at operation 280, authorized proxy 182 completes the payment on delivery by providing the RVAN to the delivery person 183 or utilizing an electronic wallet associated with the RVAN. In some embodiments, with the merchandise delivered to authorized proxy 182, the user 181 is notified of the delivery and the delivered merchandise is removed from the PCB-POD application 121.

In some embodiments, utilization of the RVAN in POD system 100 is an improvement over existing systems in that use of the RVAN significantly reduces the liability for the merchant 130 and ecommerce platform as well as risk for the buyer because, the RVAN may be, for example, a single use, single transaction, fixed value token that has payment controls limiting the use and potential abuse of the RVAN, in addition to not requiring an original payment card on file.

Figure 3:
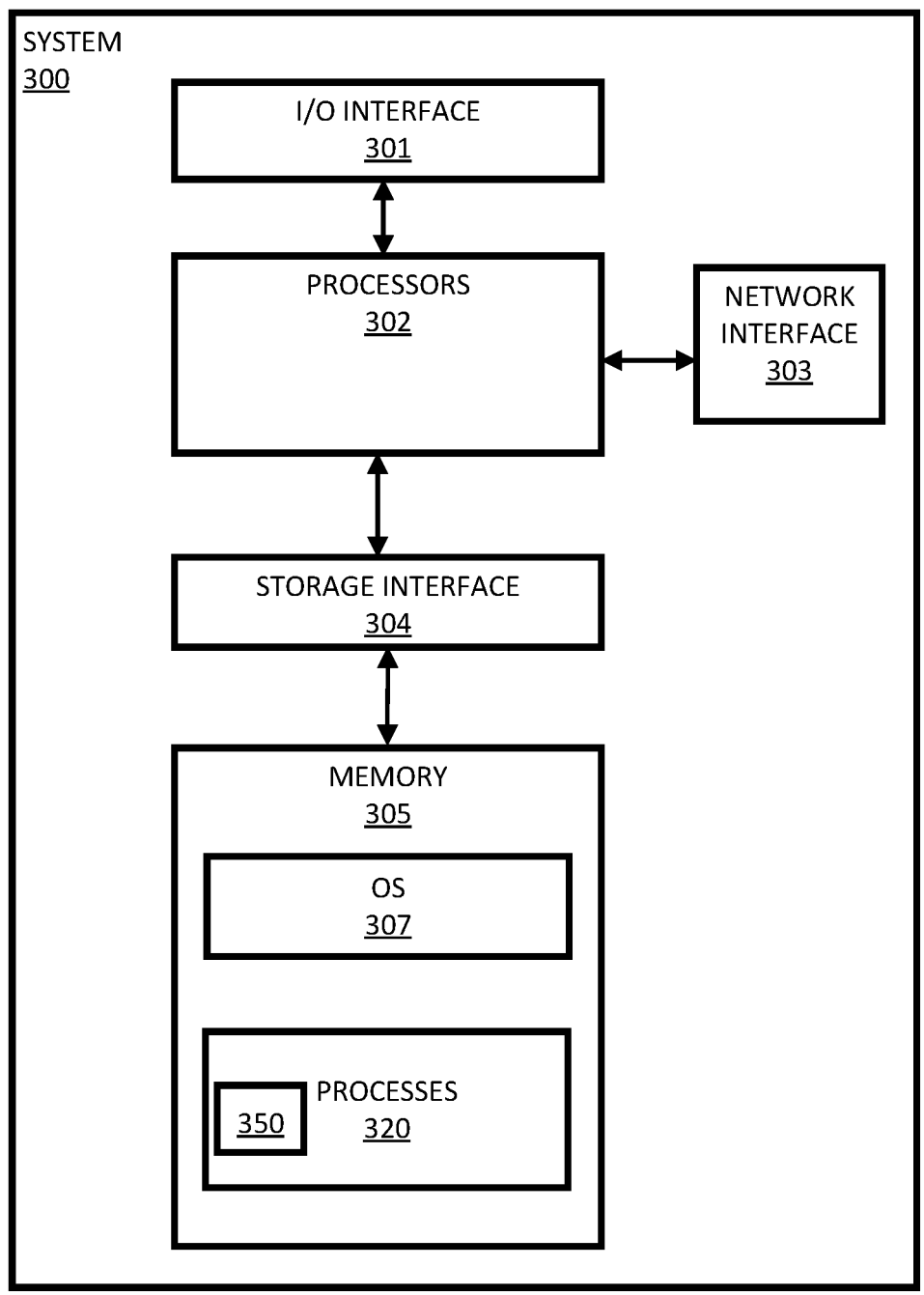
FIG. 3 is a block diagram of a system in accordance with some embodiments.

FIG. 3 illustrates a block diagram of an exemplary system 300 for implementing embodiments consistent with the present disclosure. In some nonlimiting embodiments or aspects, the system 300 may utilize a payment-control-based payment on delivery system 350 to implement a method for generating an RVAN used for payment-control-based payment on delivery. In some nonlimiting embodiments or aspects, the system 300 may utilize a payment-control-based payment on delivery system 350 to implement a method for generating an authorization-by-proxy code used for payment-control-based payment on delivery. In some embodiments, the processor 302 may comprise at least one data processor for executing program components for dynamic resource allocation at run time. The processor 302 may include specialized processing units such as integrated system (bus) controllers, memory management control units, floating point units, graphics processing units, digital signal processing units, etc.

In some embodiments, the processors 302 may be disposed in communication with one or more input/output (I/O) devices (not shown) via an I/O interface 301. The I/O interface 301 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMi), RF antennas, S-Video, VGA, IEEE 802.1 n/b/g/n/x, Bluetooth®, cellular (e.g., code-division multiple access (CDMA), high-speed packet access (HSPA+), global system for mobile communications (GSM), long-term evolution (LTE), WiMax®, or the like), etc.

In some embodiments, using the I/O interface 301, the system 300 may communicate with one or more I/O devices. For example, an input device 310 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. An output device 311 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the processors 302 may be disposed in communication with a communication network via a network interface 303. The network interface 303 may communicate with the communication network. The network interface 303 may employ connection protocols including, without limitation, direct connect, Ethernet (e.g., twisted pair Base T), transmission control protocol/Internet protocol (TCP/IP), token ring, IEEE 802.11a/b/g/n/x, etc. The communication network may include, without limitation, a direct interconnection, e-commerce network, a peer to peer (P2P) network, local area network (LAN), wide area network (WAN), wireless network (e.g., using Wireless Application Protocol), the internet, Wi-Fi®, etc. Using the network interface 303) and the communication network, the system 300 may communicate with the one or more service operators.

In some non-limiting embodiments or aspects, the processors 302 may be disposed in communication with a memory 305 (e.g., RAM, ROM, etc. not shown in FIG. 3 via a storage interface 304. In some embodiments, the storage interface 304 may connect to memory 305 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems interface (SCSI), etc. The memory drives may further include a drum, magnetic disc drive, magneto-optical drive, optical drive, Redundant Array of Independent Discs (RAID), solid-state memory devices, solid-state drives, etc.

In some embodiments, the memory 305 may store a collection of program or database components, including, without limitation, a user interface 306, an operating system 307, a web server, etc. In some non-limiting embodiments or aspects, the system 300 may store user/application data, such as the data, variables, records, etc. as described in this disclosure. Such databases may be implemented as fault-tolerant, relational, scalable, secure databases such as Oracle or Sybase.

In some embodiments, the operating system 307 may facilitate resource management and operation of the system 300. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® OS®, GOOGLE™ ANDROID™, BLACKBERRY® OS, or the like.

In some non-limiting embodiments or aspects, the system 300 may implement a web browser (not shown in the figures) stored program component. The web browser (not shown in the figures) may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers may utilize facilities such as AJAX, DHTML, ADOBE® FLASH®, JAVASCRIPT®, JAVA®, Application Programming Interfaces (APIs), etc.

Furthermore, one or more computer-readable storage media may be utilized in implementing embodiments consistent with the present disclosure. In some embodiments, a computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, e.g., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

In some embodiments, a method includes receiving, from a user of a user device, a request for an authorization-by-proxy payment on delivery (POD); requesting, at the user device, the user identify an authorized proxy for the authorization-by-proxy POD; generating an authorization-by-proxy code based upon buyer-controlled payment control parameters; and using the buyer-controlled payment parameters to control processing of a payment for the authorization-by-proxy POD.

In some embodiments, the method further includes pre-authorizing, at shipment time of merchandise associated with the authorization-by-proxy POD, a hold on a monetary amount associated with an order of the merchandise associated with the authorization-by-proxy POD.

In some embodiments of the method, the authorization-by-proxy code is configured to allow the authorized proxy to pay for and receive merchandise associated with the authorization-by-proxy POD after the user unblocks use of the authorization-by-proxy code.

In some embodiments of the method, the payment is processed when the authorized proxy provides the authorization-by-proxy code to a deliverer of the merchandise associated with the authorization-by-proxy POD.

In some embodiments, the method further includes receiving a notification of shipment of the merchandise associated with the authorization-by-proxy POD, the notification indicative of a time to provide the authorization-by-proxy code to the authorized proxy.

In some embodiments of the method, the authorization-by-proxy code is a restricted virtual account number.

In some embodiments of the method, when the authorized proxy is an IOT device, the IOT device performs a scan of an invoice associated with the merchandise upon delivery of the merchandise, the scan of the invoice being used to verify an authenticity of the merchandise being delivered.

In some embodiments of the method, the payment is processed when the IOT device verifies that the invoice maps to the authorization-by-proxy code.

In some embodiments of the method, an authorization-by-proxy POD application is used to provide the authorization-by-proxy code to the authorized proxy.

In some embodiments of the method, the authorization-by-proxy POD application is used to identify the authorized proxy for the authorization-by-proxy POD.

In some embodiments, a system includes a processor; and a non-transitory computer readable medium coupled to the processor, the non-transitory computer readable medium comprising code that: receives, from a user of a user device, a request for an authorization-by-proxy payment on delivery (POD); requests, at the user device, the user identify an authorized proxy for the authorization-by-proxy POD; generates an authorization-by-proxy code based upon buyer-controlled payment control parameters; and uses the buyer-controlled payment parameters to control processing of a payment for the authorization-by-proxy POD.

In some embodiments of the system, the non-transitory computer readable medium further comprises code that: pre-authorizes, at shipment time of merchandise associated with the authorization-by-proxy POD, a hold on a monetary amount associated with an order of the merchandise associated with the authorization-by-proxy POD.

In some embodiments of the system, the authorization-by-proxy code is configured to allow the authorized proxy to pay for and receive merchandise associated with the authorization-by-proxy POD after the user unblocks use of the authorization-by-proxy code.

In some embodiments of the system, the payment is processed when the authorized proxy provides the authorization-by-proxy code to a deliverer of the merchandise associated with the authorization-by-proxy POD.

In some embodiments of the system, a notification of shipment of the merchandise associated with the authorization-by-proxy POD is received by the system, the notification indicative of a time to provide the authorization-by-proxy code to the authorized proxy.

In some embodiments of the system, the authorization-by-proxy code is a virtual account number or a virtual phone number.

In some embodiments of the system, when the authorized proxy is an IOT device, the IOT device performs a scan of an invoice associated with merchandise upon delivery of the merchandise, the scan of the invoice being used to verify an authenticity of the merchandise being delivered.

In some embodiments, an apparatus includes an authorization-by-proxy code generation unit; an authorization by-proxy verification unit coupled to the authorization-by-proxy code generation unit; and an authorization-by-proxy notification unit coupled to authorization by-proxy verification unit, wherein based upon an authorization-by-proxy request from an authorization-by-proxy requestor, the authorization-by-proxy code generation unit provides an authorization-by-proxy code to an authorized proxy via the authorization-by-proxy notification unit, the authorization-by-proxy code being used by the authorization-by-proxy verification unit to perform a time-of-shipment preauthorization of a monetary amount associated with an authorization-by-proxy payment on delivery (POD).

In some embodiments of the apparatus, the authorization-by-proxy code includes buyer-controlled payment parameters to control processing of a payment for the authorization-by-proxy POD.

In some embodiments of the apparatus, a hold on a monetary amount associated with an order of the merchandise associated with the authorization-by-proxy POD is pre-authorized at shipment time of merchandise associated with the authorization-by-proxy POD.

In some embodiments, the payment network 140 includes the authorization-by-proxy code generation unit, the authorization by-proxy verification unit, and the authorization-by-proxy notification unit. In some embodiments, the authorization-by-proxy code generation unit is software configured to generate the authorization-by-proxy code with the buyer-controlled payment parameters. In some embodiments, the authorization by-proxy verification unit is software configured to perform the time-of-shipment preauthorization of a monetary amount associated with an authorization-by-proxy payment on delivery (POD). In some embodiments, the authorization-by-proxy notification unit is software configured to generate a notification of shipment of the merchandise associated with the authorization-by-proxy POD, the notification indicative of a time to provide the authorization-by-proxy code to the authorized proxy.

What is claimed is:

1. A method, comprising:
receiving, from a user of a user device, a request for an authorization-by-proxy payment on delivery (POD);
requesting, at the user device, the user identify an authorized proxy for the authorization-by-proxy POD;
generating an authorization-by-proxy code based upon buyer-controlled payment control parameters, wherein a buyer associated with the buyer-controlled payment control parameters is the user of the user device;
using the buyer-controlled payment parameters to control processing of a payment for the authorization-by-proxy POD;
pre-authorizing, at shipment time of merchandise associated with the authorization-by-proxy POD, a hold on a monetary amount associated with an order of the merchandise associated with the authorization-by-proxy POD, wherein the authorization-by-proxy code is configured to allow the authorized proxy to pay for and receive merchandise associated with the authorization-by-proxy POD after the user unblocks use of the authorization-by-proxy code and wherein the payment is processed when the authorized proxy provides the authorization-by-proxy code to a deliverer of the merchandise associated with the authorization-by-proxy POD; and
receiving a notification of shipment of the merchandise associated with the authorization-by-proxy POD, the notification indicative of a time to provide the authorization-by-proxy code to the authorized proxy, wherein the authorization-by-proxy code is a restricted virtual account number.

2. The method of claim 1, wherein:
the payment is processed when the authorized proxy verifies that the invoice maps to the authorization-by-proxy code.

3. The method of claim 2, wherein:
an authorization-by-proxy POD application is used to provide the authorization-by-proxy code to the authorized proxy.

4. The method of claim 3, wherein:
the authorization-by-proxy POD application is used to identify the authorized proxy for the authorization-by-proxy POD.

5. A system, comprising:
a processor; and
a non-transitory computer readable medium coupled to the processor, the non-transitory computer readable medium comprising code that:
receives, from a user of a user device, a request for an authorization-by-proxy payment on delivery (POD);
requests, at the user device, the user identify an authorized proxy for the authorization-by-proxy POD;
generates an authorization-by-proxy code based upon buyer-controlled payment control parameters;
uses the buyer-controlled payment parameters to control processing of a payment for the authorization-by-proxy POD; and
pre-authorizes, at shipment time of merchandise associated with the authorization-by-proxy POD, a hold on a monetary amount associated with an order of the merchandise associated with the authorization-by-proxy POD, wherein the authorization-by-proxy code is configured to allow the authorized proxy to pay for and receive merchandise associated with the authorization-by-proxy POD after the user unblocks use of the authorization-by-proxy code and wherein the payment is processed when the authorized proxy provides the authorization-by-proxy code to a deliverer of the merchandise associated with the authorization-by-proxy POD and wherein a notification of shipment of the merchandise associated with the authorization-by-proxy POD is received by the system, the notification indicative of a time to provide the authorization-by-proxy code to the authorized proxy and wherein the authorization-by-proxy code is a virtual account number or a virtual phone number and the authorized proxy performs a scan of an invoice associated with merchandise upon delivery of the merchandise, the scan of the invoice being used to verify an authenticity of the merchandise being delivered.

* * * * *